United States Patent [19]

Kerr

[11] 4,249,843
[45] Feb. 10, 1981

[54] APPARATUS FOR LOADING, UNLOADING AND STACKING HAY BALES

[76] Inventor: Robert J. Kerr, Rte. 4, Stephenville, Tex. 76401

[21] Appl. No.: 942,289

[22] Filed: Sep. 14, 1978

[51] Int. Cl.³ .............................................. B60P 1/34
[52] U.S. Cl. ........................................ 414/44; 414/84; 414/85; 414/471; 414/478; 414/480; 414/492; 414/510; 414/514
[58] Field of Search ............... 414/44, 84, 85, 111, 414/471, 477, 478, 479, 480, 482, 492, 497, 488, 509, 510, 514, 521, 522, 721, 722; 280/656; 56/473.5, 474, 476, 477, 480

[56] References Cited

U.S. PATENT DOCUMENTS

| | | | |
|---|---|---|---|
| 2,613,827 | 10/1952 | Van Doorne | 414/480 X |
| 2,621,814 | 12/1952 | Lisota | 414/477 |
| 2,748,965 | 6/1956 | Grey | 414/492 X |
| 2,999,608 | 9/1961 | de Ganahl | 414/661 X |
| 3,064,836 | 11/1962 | Rupert | 414/522 |
| 3,241,696 | 3/1966 | Lundahl | 414/488 |
| 3,430,792 | 3/1969 | Grove et al. | 414/477 |
| 3,485,400 | 12/1969 | Pewthers | 414/477 |
| 3,688,926 | 9/1972 | Stefanelli | 414/353 |
| 3,889,832 | 6/1975 | Hanson | 414/497 |
| 4,047,630 | 9/1977 | Young | 414/480 X |

*Primary Examiner*—L. J. Paperner
*Attorney, Agent, or Firm*—Wm. T. Wofford

[57] ABSTRACT

Apparatus for loading, unloading and stacking hay bales utilizing a load carrying vehicle with an elevatable and tiltable bed and a powdered headboard or pusher means mounted on the bed capable of traversing the length of the bed; and an independently powdered tine structure generally coextensive with but longer than the bed and extendable to protrude beyond the end of the bed an extent generally equal to the bed length and being supported cantilever fashion by the bed.

8 Claims, 10 Drawing Figures

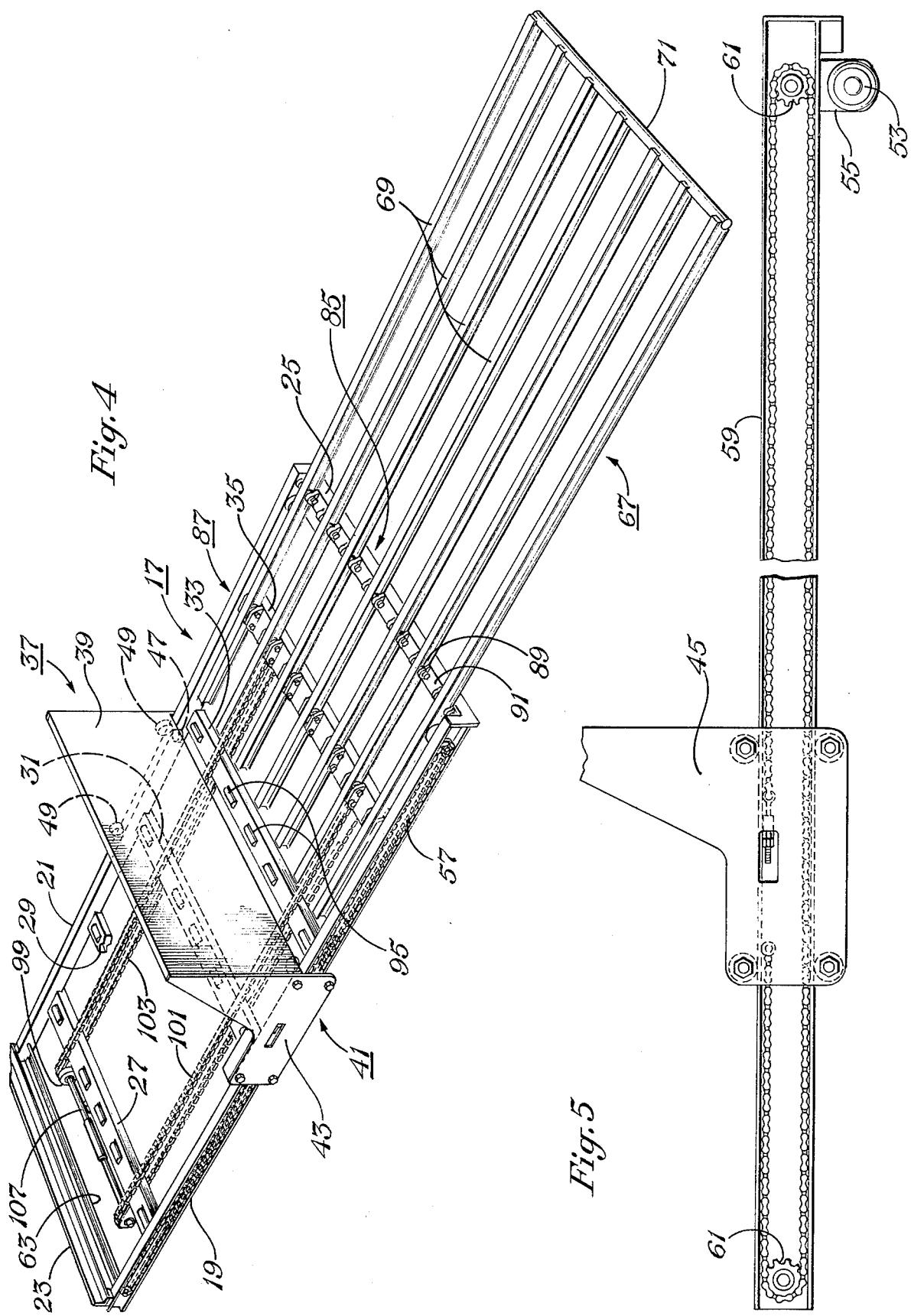

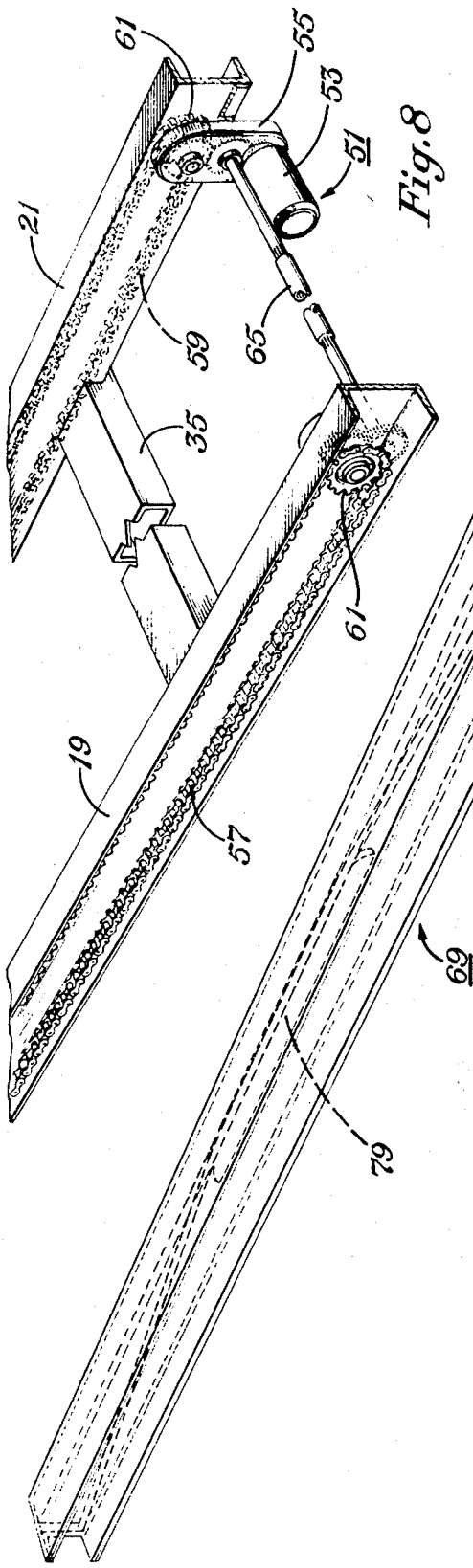
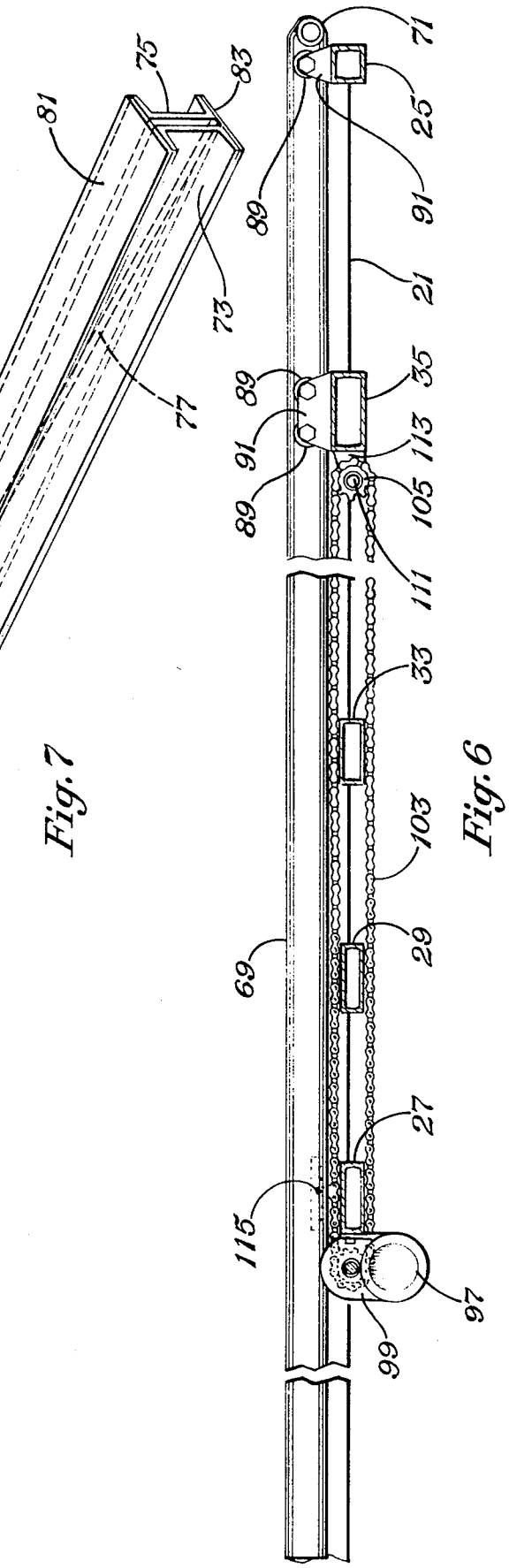

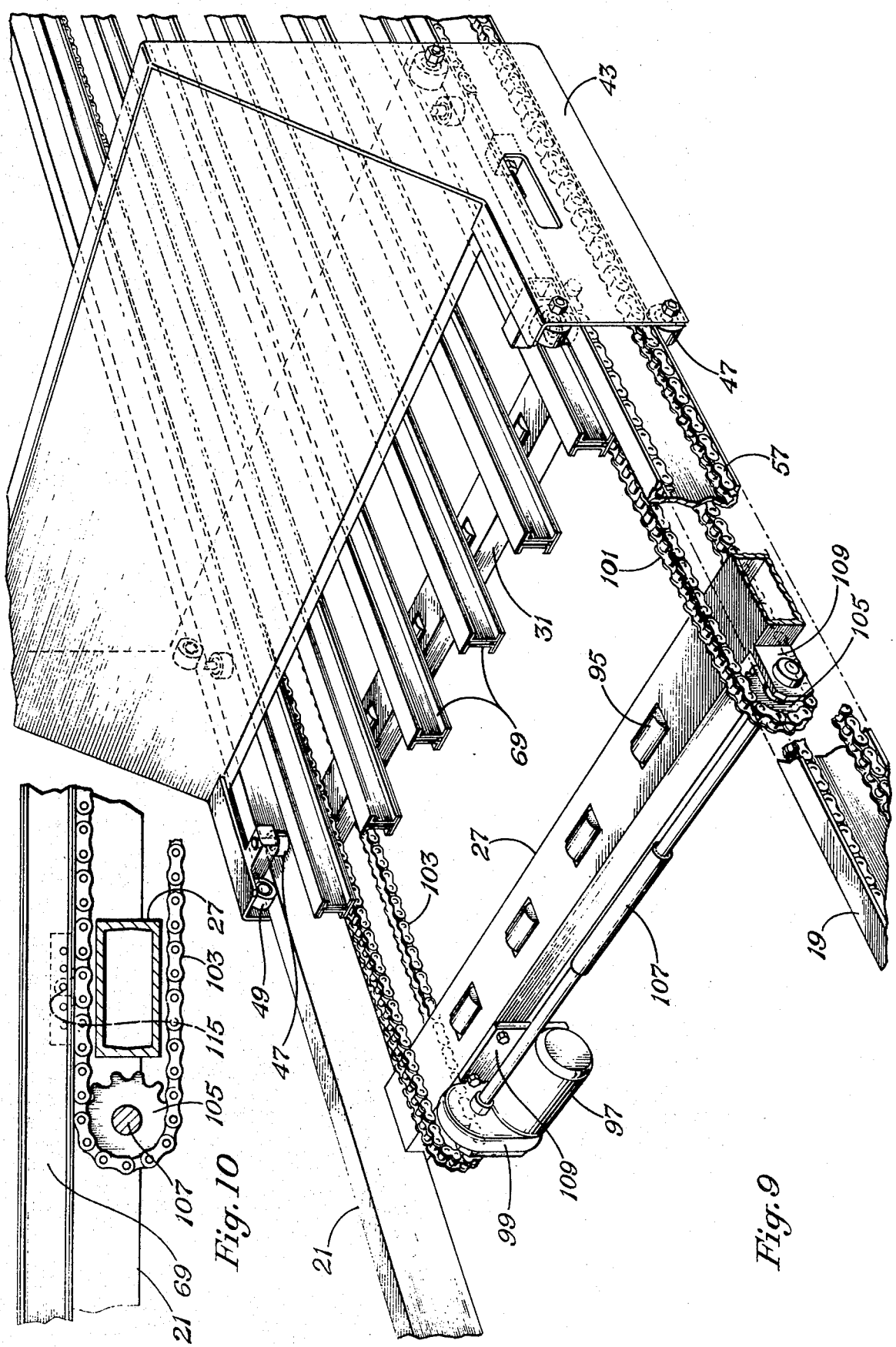

APPARATUS FOR LOADING, UNLOADING AND STACKING HAY BALES

FIELD OF THE INVENTION

The invention relates to apparatus for loading, unloading and stacking hay bales.

BACKGROUND OF THE INVENTION

For many years it has been, and is still, a common practice to bale hay in rectangular block form. A typical such bale may be 38 inches long by 18 inches wide by 14 inches high and may weigh about 70 pounds. Ranchers and dairymen need to handle and store large quantities of hay to feed their stock during times of the year when grazing grass is not available or is in short supply. It is not unusual for a dairy operation to require the handling and storing of as many as 20,000 bales of hay for one years use. Such quantities of hay are typically stored on the ground, outdoors in large stacks, which may be about thirtysix feet long and thirtysix feet wide and twelve feet high, with each such stack containing about 1,700 bales of hay. It is clearly desirable that manual bale by bale handling of such large quantities of hay should be minimized to the greatest possible extent.

In more recent years hay has been put up in round bales, which may be typically 60 inches long and 48 inches in diameter and may weigh between 1,000 and 2,000 pounds. These round bales also present a severe handling problem.

Various efforts to minimize the manual handling of hay bales have been made in the prior art of which I am aware, but none have proved to be entirely satisfactory. Such prior art is exemplified by U.S. Pat. Nos. 2,468,424, Brauch, 2,542,150, Luebbers, 2,999,608, Ganahl, 3,241,696, Lundahl and 3,889,832, Hanson.

It is accordingly an object of the invention to provide improved apparatus for loading, unloading and stacking hay bales.

For a further understanding of the invention and further objects, features, and advantages thereof, reference may now be had to the following description taken in conjunction with the accompanying drawings.

BRIEF DESCRIPTION OF THE DRAWINGS

FIG. 4 is a schematic perspective view of the apparatus of the invention showing the load carrying bed or platform without the truck and platform elevating apparatus.

FIG. 5 is a schematic side elevational view of the apparatus of FIG. 4, with the tine structure omitted and the upper portion of the powered headboard broken away, and showing a portion of the headboard powering means.

FIG. 6 is a schematic fragmentary side elevational view, partly sectioned, showing a portion of the tine structure and the tine structure powering means.

FIG. 7 is a schematic perspective view showing details of a single tine beam.

FIG. 8 is a schematic perspective view, partially broken away, showing details of the headboard powering means as viewed from the left rear.

FIG. 9 is a fragmentary schematic perspective view showing further details of the headboard carriage structure and the tine structure powering means, as viewed from the right rear.

FIG. 10 is a fragmentary side elevational view, partly sectioned, showing further details of the tine structure powering means.

SUMMARY OF THE INVENTION

Figure 1:
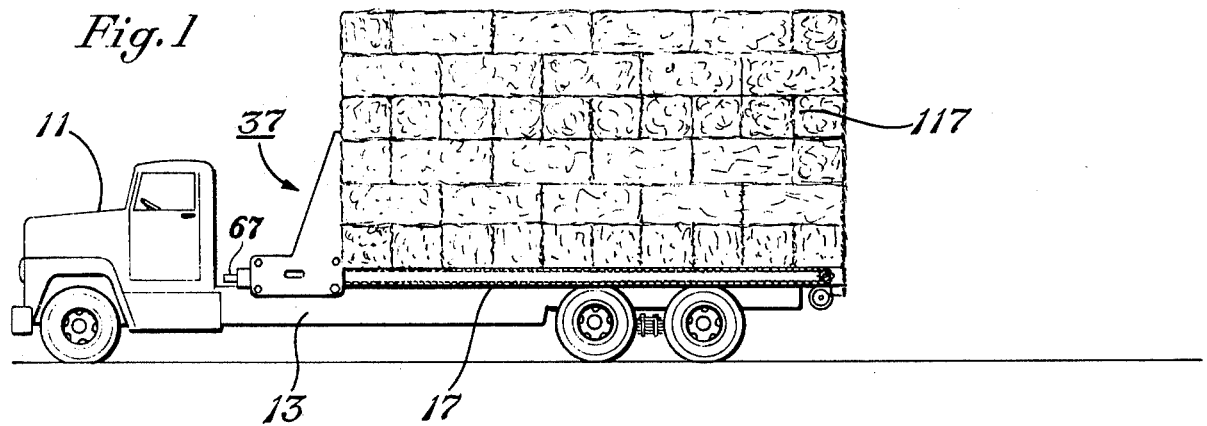
FIG. 1 is a schematic side elevational view showing a truck upon which apparatus in accordance with a preferred embodiment of the invention is installed and carrying a load of hay bales.

The apparatus of the present invention provides an effective solution to the problem of handling large quantities of hay bales with a minimum of hand labor.

Apparatus in accordance with the present invention comprises a load carrying vehicle having a bed that is elevatable and tiltable by powered means. A powered headboard or pusher means is mounted on the bed and is capable of traversing the bed length. A tine structure which is generally co-extensive with, but longer than the bed, is mounted on the bed and is capable of being extended to protrude beyond the end of the bed a distance generally equal to the bed length and supported by the bed in cantilever fashion. The tine structure is powered independantly of the headboard or pusher means. The more specific aspects of the invention in accordance with a preferred embodiment, as well as the manner of operation, are hereinafter described.

DESCRIPTION OF THE PREFERRED EMBODIMENT

Referring now to the drawings there is shown (FIGS. 1, 2, 3) a load carrying vehicle 11 having a chassis 13 upon which there is mounted bed elevating means 15 which is operatively connected to a bed or platform 17.

Figure 2:
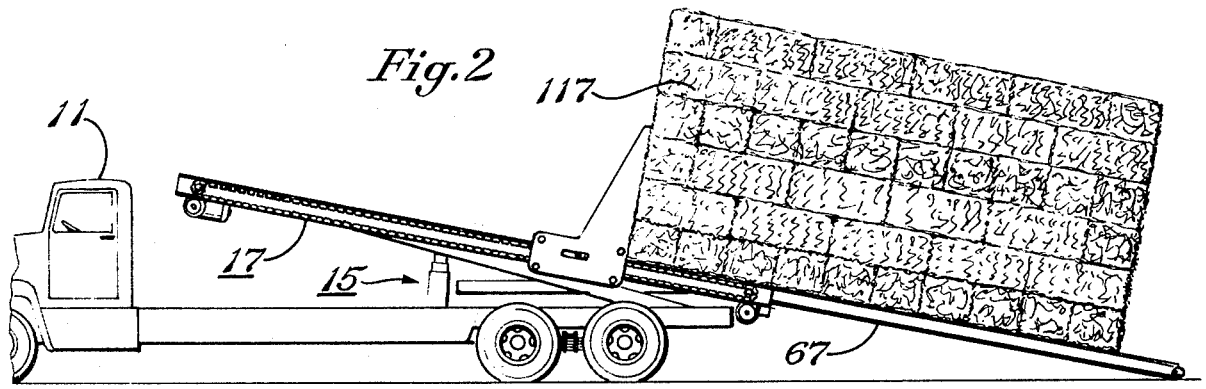
FIG. 2 is a schematic side elevational view of the truck and apparatus of FIG. 1, with the hay being unloaded on the ground.
Figure 3:
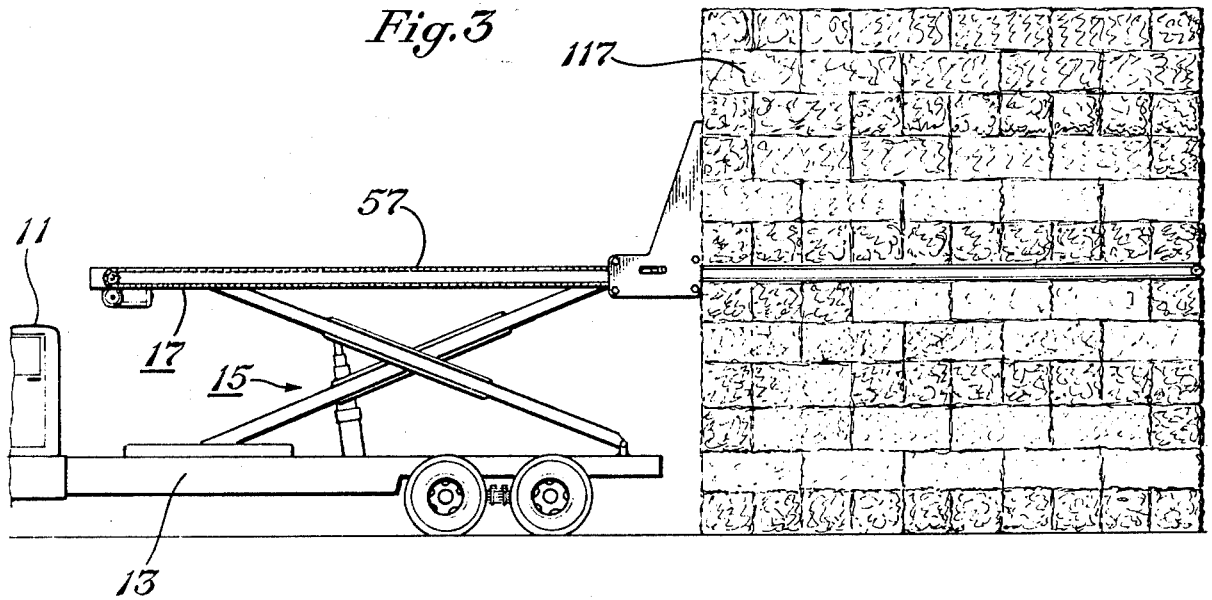
FIG. 3 is a schematic side elevational view of the truck and apparatus of FIG. 1, with the hay being unloaded on the top of a previous load.

The bed elevating means 15 is of a conventional hydraulically powered type and is consequently not shown or described in detail herein. The bed elevating means 15 is capable of permitting the bed 17 to rest on the chassis 13, as shown by FIG. 1, or to permit tilting of the bed 17, as shown by FIG. 2, or to raise the bed 17 vertically, as shown by FIG. 3.

The bed or platform 17, as best shown by FIG. 4, comprises a frame having parallel juxtaposed left and right side beams 19, 21, with front and rear beams 23, 25 normal to and bridging respectively between the front and rear ends of the side beams 19, 21 and integrally joined thereto. Intermediate beams 27, 29, 31, 33, 35 extend parallel to the front and rear beams 23, 25 and are integrally joined to the side beams 17, 19.

A headboard or pusher means 37 is mounted on the bed 17 and extends transversely thereof. The headboard or pusher means 37 comprises an upstanding load engaging portion 39 which is fixed to a carriage means 41. The carriage means 41 comprises a frame structure having left and right end members 43, 45 to which there are mounted guide rollers 47 and support rollers 49. The support rollers run along the top surfaces of the bed side beams 19, 21, which act as rails. The guide rollers 47 run along the inside and the bottom surfaces of the bed side beams 19, 21. Thus, the carriage means 41 can traverse the length of the bed 17.

A headboard carriage power means 51 is provided which comprises a chain and sprocket arrangement which is driven by a motor 53 through a gear reduction 55. The motor 53 may be either electric or hydraulic. The chain and sprocket arrangement comprises left and right drive chains 57, 59 which are mounted to respective sprockets 61 that are disposed adjacent the outside surfaces of the side beams 19, 21 at the end portions thereof. The sprockets 61 at each end portion of the side beams are mounted on a respective front idler and rear drive shaft 63, 65 that is journalled on the side beams 19, 21. The motor 53 and gear reduction 55 are mounted to the bed 17 so that the gear reduction 55 drives the rear shaft 65. The carriage means 41 is attached to each chain 57, 59, so that movement of the chains 57, 59 will cause the carriage means 41 to traverse the length of the bed 17.

A tine structure 67 (as best shown by FIG. 4) is made up of a plurality of parallel spaced tine beams 69 which extend longitudinally of the bed 17 and are joined at their rearward ends to a common end beam 71.

Each tine beam 69, in the embodiment shown, (as best shown by FIG. 7) is made up of a pair of channel members 73, 75 disposed in back-to-back relation, with a tension rod 77 and rod support bar 79 disposed between the adjacent surfaces of the channel members and fixed thereto. Respective plates 81, 83 co-extensive with the upper and lower surfaces of the channel member assembly are fixed respectively thereto. With such structure, the tine beam 69 can support heavy loads in cantilever fashion without bending.

Means for mounting the tine structure 67 on the bed 17, in the embodiment shown, comprises two sets of retainer roller assemblies; a first set 85 being mounted on the bed rear beam 25 and a second set 87 being mounted on the most rearward bed intermediate beam 35. Each retainer roller assembly of the first set 85 includes a pair of rollers 89 mounted on bosses 91 that are fixed to the rear beam 25, so as to be juxtaposed on opposite sides of the web portion 93 of a respective tine beam 69. Each retainer roller assembly of the second set 87 includes four rollers 89 mounted in pairs on bosses 91 that are fixed to the intermediate beam 35, so as to be juxtaposed in pairs on opposite sides of the web portion 95 of a respective tine beam. Thus, when the tine structure 67 is in its extended position, it is supported and retained in cantilever fashion by the mounting means. A set of tine structure support rollers 95 is provided for each bed intermediate beam except the rear most one. These support rollers 95 are aligned with respective tine beams 69 so that each tine beam will be supported by a support roller when it is positioned over a respective intermediate beam.

A power means for driving the tine structure 67 is provided which comprises a chain and sprocket arrangement which is driven by a motor 97 through a gear reduction 99. The motor 97 may be either electric or hydraulic. The chain and sprocket arrangement comprises left and right drive chains 101, 103 which are mounted to respective front and rear sprockets 105 that are disposed between the side beams 19, 21. The left and right drive chains 101, 103 are respectively aligned with a respective next to the outer most tine beam 69. The front sprockets 105 are mounted on a drive shaft 107 that is journalled on brackets 109 that are fixed to the front face of the front-most intermediate beam 27 (see FIG. 9). The motor 97 and gear reduction 99 are mounted on one of the brackets 109, just mentioned, so that the gear reduction 99 drives the drive shaft 107. The rear sprockets 105 are mounted on an idler shaft 111 which is journalled on brackets 113 that are fixed to the front face of the rear most intermediate beam 35. The respective drive chains 101, 103 are fixed by linking devices 115 (see FIG. 10) to respective to the outer most tine beams 69 at points such that when the tine structure 67 is retracted (as shown by FIG. 6) the linking devices 115 are adjacent the rear sprockets 105 and the upper sides of the chains 101, 103 are adjacent the forward limit of their traverse. When the tine structure 67 is fully extended (as shown by FIG. 4) the upper sides of the chains 101, 103 are adjacent the rearward limit of their traverse. The upper sides or reaches of the chains 101, 103 pass over the intermediate beams 27, 29, 33, while the lower sides pass beneath same (see FIG. 10). The front beam 23 is fixed to the upper surfaces of the side beams 19, 21 so that the tine beams 69 can pass beneath same and beyond the forward end of the bed 17 as the tine structure 67 approaches the fully retracted position.

The operation of the apparatus for loading, unloading and stacking hay bales will now be described. Assume that the load carrying vehicle 11 is fully loaded with a stack 117 of hay bales, as shown by FIG. 1. It should be noticed that the hay bales are disposed in interlocking manner, with a suitable number of bales employed to make an interlocked stack of dimensions suitable to make a full load for the vehicle. The bed 17 is at rest on the vehicle chassis 13 and the headboard 37 and the tine structure 67 are in their fully retracted positions.

Now, to unload the stack 117 onto the ground (see FIG. 2) the tine structure 67 is first moved to its fully extended position, and then the bed 17 is tilted until the rearward end of the tine structure 67 rests on the ground. Next, the headboard 37 is moved to its extreme rearward position, pushing the stack 117 downwardly on the tines 69. Next, the tine structure 67 is retracted while the headboard 37 remains in its extreme rearward position. This procedure leaves the stack 117 resting on the ground in the manner of the lower stack 117 of FIG. 3.

Again assume that the vehicle 11 is fully loaded with a stack 117 as hereinabove described, and it is desired to unload the stack onto the top of the one that is already on the ground. First, the bed 17 is elevated to a height where it is slightly above the upper surface of the stack on the ground. Next, the tine structure 67 is moved to the fully extended position so that the tine structure now rests on the upper surface of the stack on the ground. Next, the headboard 37 is moved to its extreme rearward position, pushing the load stack onto the tine structure 67. Next, the tine structure is retracted while the headboard 37 remains as its extreme rearward position, thus leaving the load stack deposited on top of the ground stack. Next, the bed 17 is lowered to its rest position and the headboard 37 is returned to its extreme forward position and the apparatus is ready for another operation.

For handling round type hay bales, the same procedure above described would be used, except, of course, there would be far fewer bales per load (typically six).

While I have shown my invention in only one form, it will be obvious to those skilled in the art that it is not so limited, but is susceptible of various changes and modifications without departing from the spirit thereof.

What is claimed is:

1. Apparatus for loading, unloading and stacking hay bales, comprising:
   a. a load carrying vehicle;
   b. a load carrying bed or platform;
   c. bed elevating means mounted on said vehicle and operatively connected to said bed, with said elevating means being capable of tilting said bed about an axis extending transversely of said bed;
   d. headboard or pusher means mounted on said bed and extending transversely of said bed;
   e. carriage means for said headboard permitting traverse of said headboard longitudinally from the front to the rear of said bed;
   f. power means for driving said headboard carriage;
   g. a tine structure having width about the same as that of said bed and length greater than that of said bed;
   h. means mounting said tine structure on said bed and permitting traverse of said tine structure longitudinally of said bed from a retracted position wherein a load carrying portion of said tine structure is about co-extensive with said bed to an extended position wherein said load carrying portion of said tine structure protrudes from the end of said bed sufficiently to extend beneath and support an entire vehicle load;
   i. power means for driving said tine structure.

2. The apparatus of claim 1 wherein:
   a. said tine structure is made up of a plurality of parallel spaced beams which extend longitudinally of said bed and are joined at their rearward ends to a common end beam.

3. The apparatus of claim 2 wherein:
   a. said means mounting said tine structure on said bed includes retainer-roller means for supporting and retaining said tine structure cantilever fashion from the end portion of said bed.

4. The apparatus of claim 3 wherein:
   a. said tine structure beams have the general shape of I-beams and said rollers of said retainer-roller means are juxtaposed on opposite sides of the web portion of each of said respective beams.

5. The apparatus of claim 2 wherein said power means for driving said headboard carriage is a chain and sprocket arrangement powered by a motor through a gear reduction and said power means for driving said tine structure is also a chain and sprocket arrangement powered by a motor through a gear reduction.

6. The apparatus of claim 5 wherein said motors are hydraulic motors.

7. The apparatus of claim 5 wherein said motors are electric motors.

8. The apparatus of claim 5 wherein the motor and gear reduction for driving said tine structure is disposed at the front portion of said bed and the motor and gear reduction for driving said headboard carriage is disposed at the rear portion of said bed.

* * * * *